United States Patent [19]
Steadman et al.

[11] Patent Number: 5,204,000
[45] Date of Patent: Apr. 20, 1993

[54] TANK FOR SEPARATING WATER AND HYDROCARBON FUELS FROM CONTAMINATED WATER

[75] Inventors: Gary E. Steadman, Sherwood Park; Richard R. Scragg, Edmonton, both of Canada

[73] Assignee: ZCL Mfg Canada Inc., Edmonton, Canada

[21] Appl. No.: 829,755

[22] Filed: Jan. 31, 1992

[51] Int. Cl.⁵ .............................................. C02F 1/40
[52] U.S. Cl. .................... 210/519; 210/521; 210/533; 210/538; 210/539
[58] Field of Search ................ 210/519, 521, 532.1, 210/533, 536, 538, 539, 540, 170

[56] References Cited

U.S. PATENT DOCUMENTS

| | | | |
|---|---|---|---|
| 651,294 | 6/1900 | Burger et al. | 210/536 |
| 2,879,895 | 3/1959 | McLain | 210/521 |
| 3,425,913 | 2/1969 | Holden | 210/521 |
| 3,957,656 | 5/1976 | Castelli | 210/521 |
| 4,042,512 | 8/1977 | McCarthy et al. | 210/519 |
| 4,059,517 | 11/1977 | Strahorn et al. | 210/539 |
| 4,257,895 | 3/1981 | Murdock | 210/532.1 |
| 4,604,196 | 8/1986 | Lowrie et al. | 210/540 |
| 4,722,800 | 2/1988 | Aymong | 210/519 |
| 4,886,605 | 12/1989 | Hervé | 210/519 |

FOREIGN PATENT DOCUMENTS

| | | |
|---|---|---|
| 576908 | 8/1924 | France . |
| 613769 | 7/1978 | U.S.S.R. . |
| 850138 | 7/1981 | U.S.S.R. . |

Primary Examiner—Stanley S. Silverman
Assistant Examiner—Christopher Upton
Attorney, Agent, or Firm—Dvorak and Traub

[57] ABSTRACT

The disclosure describes a tank for separating water and hydrocarbon fuels from contaminated water which comprises an elongated vessel having, at one end thereof, an inlet for delivering contaminated water into the vessel. A distribution baffle is mounted at this end of the vessel for directing the incoming flow of contaminated water into multiple streams thereby reducing the incoming turbulent flow into a laminar flow whereby water is directed towards the opposite end of the vessel in an unobstructed manner so that light hydrocarbon fuel droplets may be allowed to rise and be collected on the surface of the water. A outlet piping is providing at the opposite end of the vessel for discharging water free of hydrocarbon fuels.

5 Claims, 3 Drawing Sheets

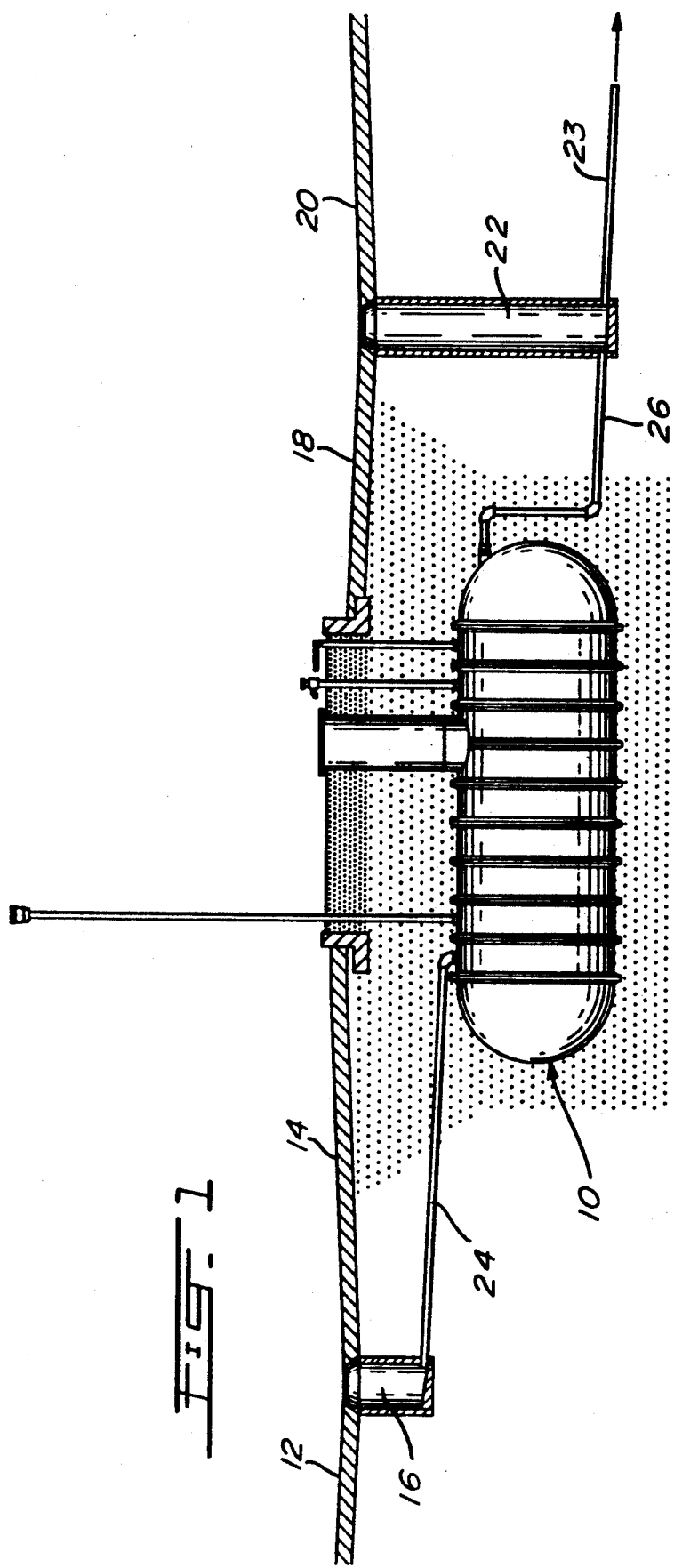

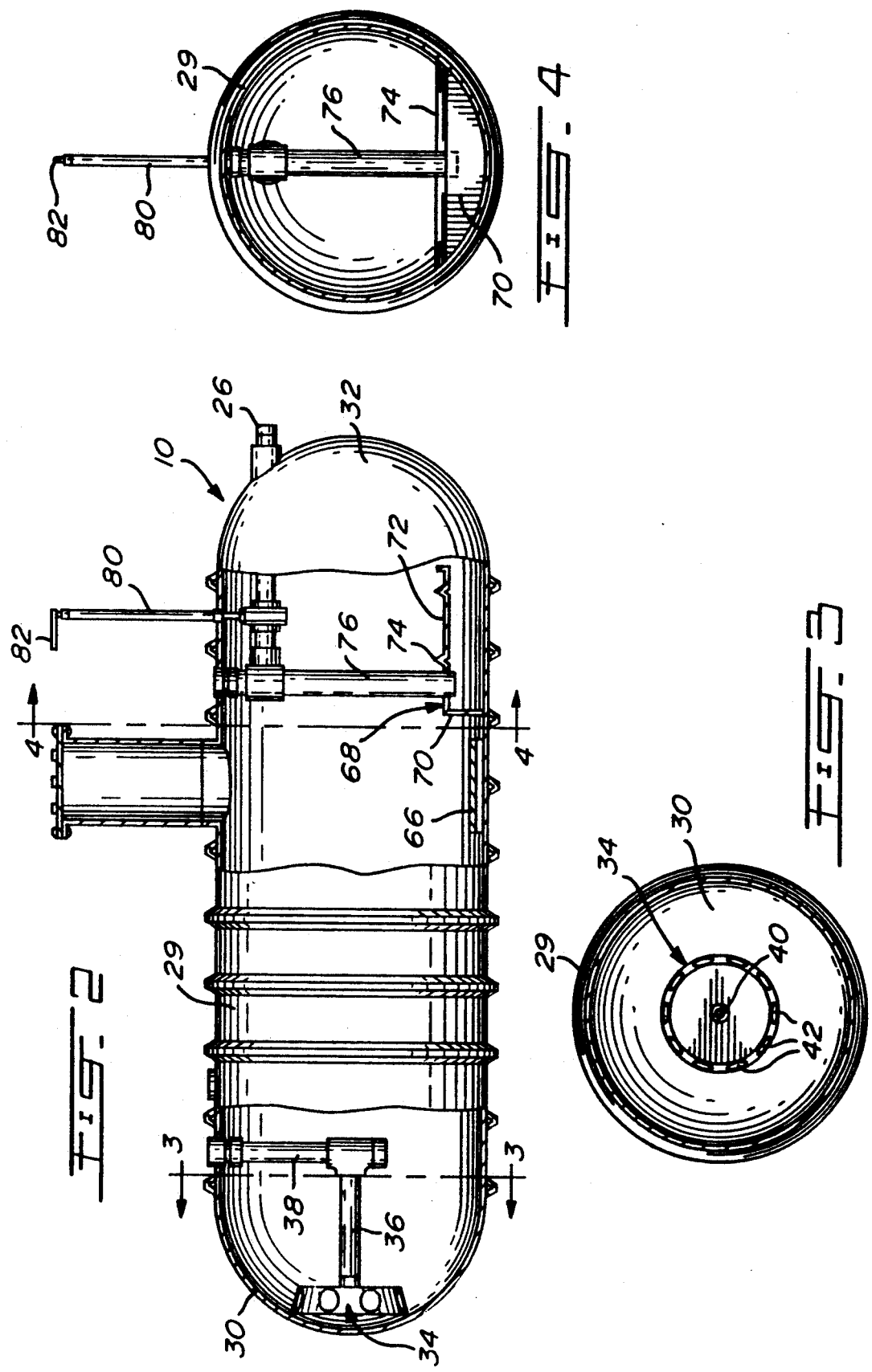

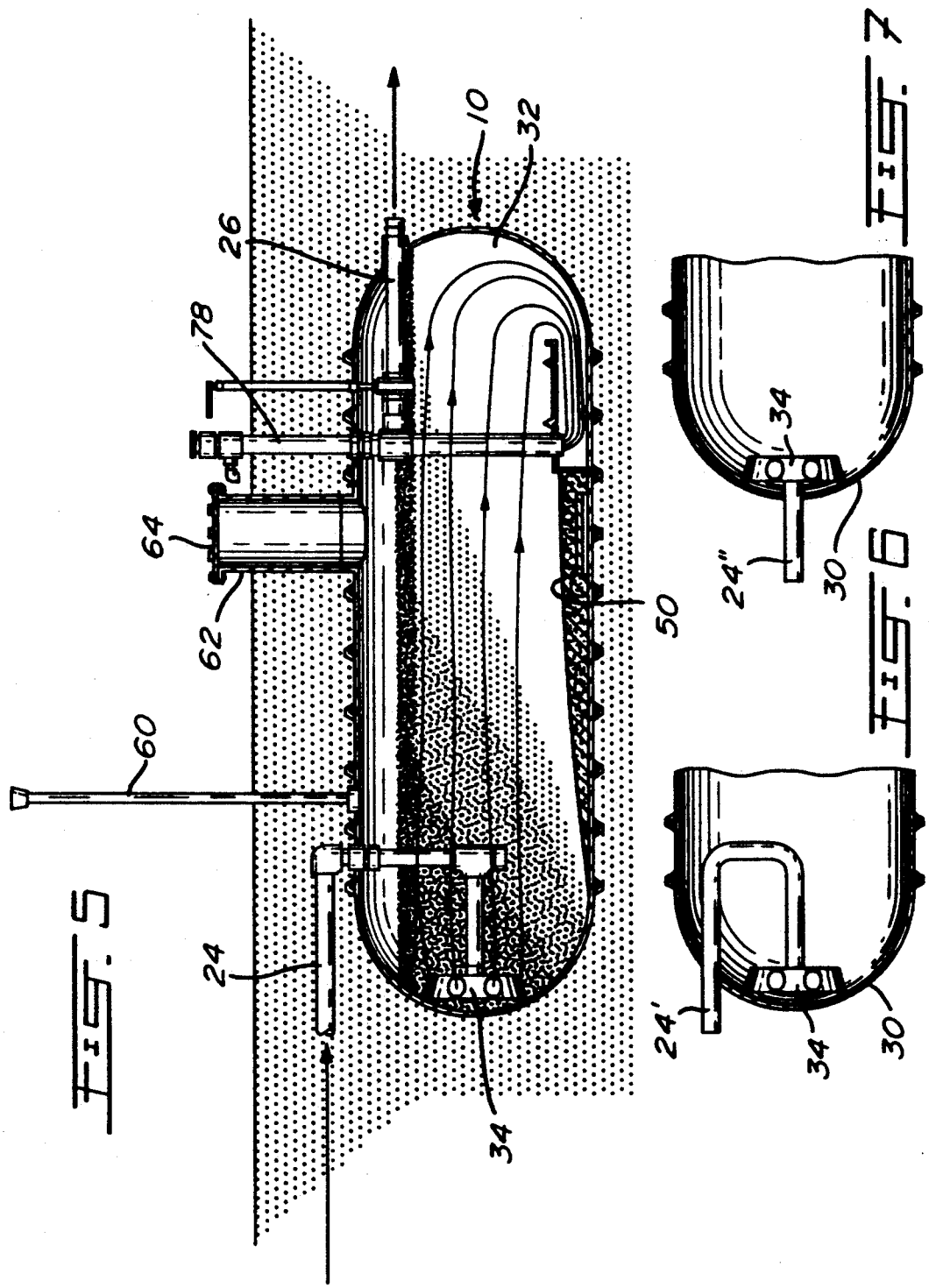

TANK FOR SEPARATING WATER AND HYDROCARBON FUELS FROM CONTAMINATED WATER

FIELD OF THE INVENTION

The present invention relates to a tank or container for separating water and hydrocarbon fuels from contaminated water and, more particularly, to such tank designed to be installed underground.

BACKGROUND OF THE INVENTION

The disposal of waste water contaminated with hydrocarbon fuels, such as oil, is at present a problem. Oil-water separators are used to clean waste water by removing and retaining oil, allowing mostly purified water to be discharged into a drainage system. Such separators operate on the gravity differential principle and utilize the natural buoyancy of oil droplets in the water to force them to the surface, where they accumulate, effectively removed from the flow. Incoming contaminated water displaces clean water, already stripped of oil, and pushes it out of the vessel from the bottom through a discharge riser. Oil is retained at the top of the separator, where it may be periodically removed. Heavy, solid particles carried into the separator with the flow may have oil adhering to their surfaces; these particles settle to the bottom of the vessel as sludge and are also retained for periodic removal. Such separators are well suited for bulk fuel plants, truck stops, gas bars, petroleum terminals, industrial sites, vehicle repair garages, car washes, parking lots, rail and ship yards, and the like.

It is important to maintain the flow of water inside the tank from one end to the other as laminar as possible since turbulence causes oil droplets to mix in the vertical direction at a rate greater than the rise rate of the droplets.

OBJECTS AND STATEMENT OF THE INVENTION

It is therefore an object of the present invention to maintain a very smooth flow of liquid from one end of the vessel to the other. This is achieved by providing, at the input end of the vessel, means which will minimize the incoming turbulent flow of the liquid.

The present invention therefore relates to a tank for separating water and hydrocarbon fuels from contaminated water which comprises:

an elongated vessel having opposite ends;

inlet means adjacent a first of said ends for delivering contaminated water to the vessel;

distribution baffle means mounted at the first end and connected to the inlet means for directing, in the vessel, the contaminated water in multiple streams thereby altering the incoming turbulent flow of the contaminated water from the inlet means into a laminar flow whereby light hydrocarbon fuel droplets are allowed to rise and be collected on the surface of the water; and outlet means adjacent a second of the ends for discharging water free of hydrocarbon fuels from the vessel.

The shape of the vessel is such that, by splitting the single incoming stream into several outgoing streams which will follow the contour of the inlet end of the vessel end, the turbulent incoming flow is decelerated and directed along a smooth surface so that it can quickly adopt a laminar flow state.

In one preferred form of the invention, a sludge baffle is mounted near the exit end of the vessel. The primary functions of this baffle are to provide a barrier behind which the sludge may collect and to direct the flow of water, first, towards the end wall of the vessel allowing maximum time for the separation of oil and water to occur, and, secondly, to provide a channel for the reverse flow of this water, at accelerated speed, towards an outlet piping.

Furthermore, the tank includes a vent which is combined with the outlet means of the vessel in such a way that it may be used also as a sampling port. This configuration allow access through the vent to the outflow stream of the tank for monitoring the quality of the effluent by a variety of methods.

In another form of the invention, the tank is provided with an emergency shut-off valve in the outlet means, the valve being connected to a remote actuator. The purpose of this valve is to stop the outflow of any liquids from the vessel under emergency conditions and thereby prevent the flow of certain products through the unit.

Other objects and further scope of applicability of the present invention will become apparent from the detailed description given hereinafter. It should be understood, however, that this detailed description, while indicating preferred embodiments of the invention, is given by way of illustration only, since various changes and modifications within the spirit and scope of the invention will become apparent to those skilled in the art.

BRIEF DESCRIPTION OF THE DRAWINGS

For a better understanding of the present invention, reference is had to the following description taken in connection with the accompanying drawings in which like reference numerals refer to like parts throughout the several views:

FIG. 1 is a schematic elevational view of a storage tank made in accordance with the present invention and shown installed underground;

FIG. 2 is an elevational, partly crosssectional, view of the storage tank;

FIG. 3 is a cross-sectional view taken along lines 3—3 of FIG. 2;

FIG. 4 is a cross-sectional view taken along lines 4—4 of FIG. 2;

FIG. 5 is an elevational cross-section view of the tank showing the water-oil separation and flow; and FIGS. 6 and 7 show two variants of vessel inlet means made in accordance with the present invention.

DESCRIPTION OF PREFERRED EMBODIMENTS

Referring to FIG. 1, there is shown a tank 10 made in accordance with the present invention and buried underground in accordance with conventional installation methods. A potential spill area is illustrated on the left side of this figure wherein a pair of slopping surfaces 12 and 14 direct contaminated water into a catch basin or trough 16. On the right side of the figure, a non-spill area is illustrated consisting also of two slopping surfaces 18 and 20 which direct water to a catch basin 22, connected to drainage system (not shown) through a pipe 23.

An inlet piping 24 directs contaminated water to the storage tank 10 while a discharge piping 26 directs water collected from the tank 10 to the drainage system.

By installing the tank underground, as opposed to ground surface, the risk of fire and explosion and the hazards associated with open pits are greatly reduced. It also makes a more efficient use of space of a site.

Referring to FIG. 2, tank 10 consists of an elongated vessel having a cylindrically shaped body 29 and opposite dome-shaped end walls 30 and 32. Other cross-sectional shapes may be equally efficient; theorically, the retention capacity for oil and for sludge would be increased for a given tank size if the cross-sectional shape were to be approximately square; but, this introduces additional fabrication and installation considerations. The circular cross-section is one of the simplest in manufacture and the installation techniques for such a configuration are well established.

The end walls of the tank are shown as having a hemispherical shape. However, they may also be semi-elliptical to suit, for example, smaller tanks. An important factor, however, about the shape of the end wall of the vessel is that it be concave with a smooth profile to direct the flow of liquid smoothly into the front end of the vessel, without creating additional turbulence. A flat end, under some conditions, may be effective; but, the concave shape is more efficient over a wider range of operating parameters.

Next to the inner face of the end wall, a distribution baffle 34 is provided, preferably located at the approximate centre of the wall. It is connected inside the vessel to a pipe 36 which, in turn, is connected to a second pipe 38, in turn connected to the inlet piping 24. As illustrated in FIG. 3, the baffle 34 receives the incoming flow of the inlet piping through a hole 40 at the centre of the baffle and is redirected, in multiple streams, through a series of peripheral openings 42, to follow the contour of the dome wall 30 whereby, the turbulent incoming flow is decelerated and redirected along the smooth inner surface of the wall so that it can quickly adopt a laminar flow state. Hence, the shape of the distribution baffle and the size of its openings, as well as the shape of the dome-shaped wall, influence the rate or distance within which the incoming turbulent flow is changed into a laminar flow.

As mentioned above, the tank of the present invention operates on the gravity differential principle and utilizes the natural buoyancy of oil droplets in the water to force them to the surface where they accumulate, effectively removed from the flow. As illustrated in FIG. 5, incoming contaminated water displaces clean water, already stripped of oil, towards the opposite end wall 32. Oil is retained at the top of the tank where it may be periodically removed. Heavy, solid particles carried into the tank with the flow may have oil adhering to their surfaces. These particles settle to the bottom of the vessel as sludge 50 and are also retained for periodic removal.

The distribution baffle 34 is placed at the approximate centre of the dome. The theoretical best place to direct the incoming flow would be on the separation surface between the water and the oil. This would give the shortest possible distance for the oil droplets to move to achieve separation. However, this surface moves constantly up and down and it is difficult to direct a flow accurately to this position. Therefore, it has been decided in the present invention to direct the flow at the mid-height of the vessel so that, on average, the flow is introduced near the separation line. The flow is directed uniformly in all directions in order to minimize the turbulence and also to minimize the effect of any remixing of oil and water, already in the tank, by turbulent action.

In addition to the top entry illustrated in FIGS. 1, 2 and 5, a dome entry 24' (see FIG. 6) and a central dome entry 24" (see FIG. 7) of the contaminated water are also possible.

Referring to FIG. 5, the central portion of the vessel is deliberately left as unobstructed as possible to minimize any regeneration of turbulence. A vent 60 is, however, provided for equalization of pressures due to the rise and fall of liquid inside the vessel. A manway 62 is mounted to the central portion of the tank and includes a lid 64 which may incorporate a small fitting which may be used for the insertion of a measuring device, such as a calibrated stick, for routine monitoring of liquid and sludge levels within the tank. The manway cover 64 is removable to allow for visual inspection inside the tank and as an access port for emptying the contents from the vessel, and for cleaning the vessel as necessary. The manway may be of variable length to accommodate varying burial depths and may be fabricated as an integral part of a tank, or as a separate piece which may be joined to the vessel by various means at the time of installation. Below the manway, on the bottom wall of the vessel, is a defector plate 66 (see FIG. 2) of approximately the same projected area as the manway opening; this plate protects the bottom of the vessel from occasional impact damage due to monitoring or emptying of the vessel, or during servicing operations. This deflector plate is optional for those materials of construction that may be sensitive to impact damage, such as fibreglass.

Adjacent to the deflector plate 66 is mounted a sludge baffle 68 which presents a short vertical wall 70 to the fluid flow, giving a region in the lower portion of the vessel for the accumulation of heavy dirt particles which settle from the incoming water stream. The nominal volume of the sludge collection zone is controlled by the height of the sludge baffle. The latter includes a horizontal section 72 which directs the water flow to the far end of the vessel, thereby making best advantage of the available length of the vessel. Baffle 68 is attached with a water tight joint along its contact line with the vessel walls. The baffle is constructed with rib sections 74, or stiffeners, to give it adequate strength to withstand the weight of a workman, which may be present while servicing.

On the horizontal wall of the baffle, near the vertical wall, is a hole of appropriate size to receive the end of a discharge riser 76 connected to the discharge pipe 26. Hence, the primary functions of the baffle are to provide a barrier behind which sludge may collect and to direct the flow of water, first, towards the end of the vessel allowing the maximum time for the separation of oil and water to occur, and, secondly, to provide a channel for the reverse flow of the water, at accelerated speed, towards the outlet pipe 76. The accelerated speed of this reverse flow is important because it creates a scouring action within the reverse flow zone which prevents the further build-up of any sludge in those portions of the vessel. In this way, the unit is self-cleaning in this critical zone and, therefore, provides more reliable operation without the need for attendance by an operator.

The discharge riser 76 directs the flow upward from behind the sludge baffle and, then, horizontally in pipe 26 until it exits through the vessel end wall 32. The elevation of pipe 26, as it passes through the wall of the vessel, controls the nominal static total volume of the liquids and accumulated solids within the vessel. This outlet pipe provides a means 78 of venting to atmosphere, as a siphon breaker, to prevent a natural siphoning action that may occur under some conditions.

In the embodiment illustrated, vent 78 is connected to riser 76 in such a way that it may also be used as a sampling port. This configuration allows access through the vent to the outflow stream of the vessel for monitoring the quality of the effluent by a variety of methods.

Preferably, an emergency shut-off valve 80 is connected to pipe 26 and, through a remote actuator 82 (of either the manual or automatic type), may be activated by an attendant. The purpose of this valve is to stop the outflow of any liquids from the vessel under emergency conditions, and thereby prevent the flow of certain products through the unit. This emergency action would most usually be taken in the event of a large spill of contaminant entering the vessel which may exceed the retention capacity of the vessel, or which may not be adequately retained by the action of the vessel.

The vessel is fabricated from non-corroding and inert materials which may be selected on the basis of adequate service history in contact with the chemicals and liquids that would be anticipated in a service of this type. One type of material is fibreglass reinforced plastics material for the vessel, the distribution baffle, the sludge baffle and the manway. Rigid polyvinyl chloride (PVC), and /or fibreglass pipe are used for the internal piping. The valve is a commercially available unit fabricated from plastics material. The deflector plate is of aluminium material and is laminated to the bottom of the vessel. Alternate material could be used to manufacture these components; such as metals (with or without protective coatings), other plastics, concrete or brick, or any other structural material that is resistant to this type of environment.

Hydrocarbons to be captured include diesel fuel, gasoline, heating fuel, jet fuel, etc.

Floating hydrocarbons can be removed by a variety of methods as may be appropriate for the installation. Common methods include pumping, skimming, vacuum suction, etc. Removal methods can be manual or automatic. Sludge may be removed by trash pump hose or vacuum hose inserted through the fitting in the manway or through the manway after removal of the cover.

It should be understood that the present invention should be limited to hydrocarbons with a specific gravity equal to or less than the specific gravity of the water from which they are mixed. Additionally, if the specific gravity of the hydrocarbon is only slightly less than the water, it will require extended periods of time (that is reduced flow rates) to achieve effective separation. Also, there is a fraction of hydrocarbons which is soluble in water which cannot be separated by the gravity differential principle.

Further, present gravity differential separators have limited effectiveness for removal of hydrocarbons in the form of emulsions, extremely fine droplets, or hydrocarbons that have been treated with detergents or soaps. Also, the presence of ice crystals, algae, floating debris, froth or foam, or other floating materials may have a detrimental effect on the efficiency of the present invention. For best efficiency, these floating materials should be removed as soon as possible. Also, the viscosity of water is an important physical property in the function of a gravity differential separator. Therefore, the efficiency of the present invention may be reduced when treating waters containing chemicals or materials which have the effect of increasing the viscosity of the water.

Therefore, it is wished that the present invention not be limited in interpretation, except by the terms of the following claims.

The embodiments of the invention in which an exclusive property or privilege is claimed are defined as follows:

1. A tank for separating water and hydrocarbon fuels from contaminated water comprising:
    an elongated vessel having opposite ends;
    inlet means adjacent a first or said ends for delivering contaminated water to said vessel;
    distribution baffle means mounted at said first end and connected to said inlet means for directing, in said vessel, said contaminated water in multiple streams thereby altering an incoming turbulent flow of said contaminated water from said inlet means into a laminar flow whereby light hydrocarbon fuel droplets are allowed to rise and be collected on the surface of water in said vessel; and
    outlet means adjacent a second of said ends for discharging water free of hydrocarbon fuels from said vessel,
    further comprising sludge baffle means on a bottom wall of said vessel adjacent said second end,
    said sludge baffle means include a vertical wall connected to a bottom of said vessel to provide a barrier for the accumulation of sludge therebehind and a horizontal wall extending downstream of said vertical wall to direct water flow to said second end of said vessel,
    said outlet means comprises a piping having an inlet end in said vessel disposed below said horizontal wall of said sludge baffle means thereby providing a channel for the reverse flow of water from said second end of said vessel towards said inlet end of said piping.

2. A tank as defined in claim 1, wherein said sludge baffle means is made of fibreglass reinforced plastics material.

3. A tank as defined in claim 1, wherein said piping includes a vertical section extending through said horizontal wall of said sludge baffle means and a horizontal section extending through said second end of said vessel.

4. A tank as defined in claim 1, further comprising vent means having one end connected to said piping and an opposite end for venting to the atmosphere.

5. A tank as defined in claim 1, further comprising emergency shut-off valve means connected to said piping and remotely operable to stop the flow of water through said piping.

* * * * *